July 21, 1959  E. J. DOPERALSKI  2,895,774
PISTON ASSEMBLY
Filed April 15, 1957  2 Sheets-Sheet 1
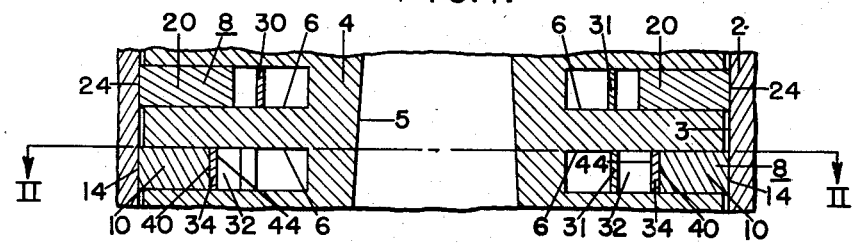
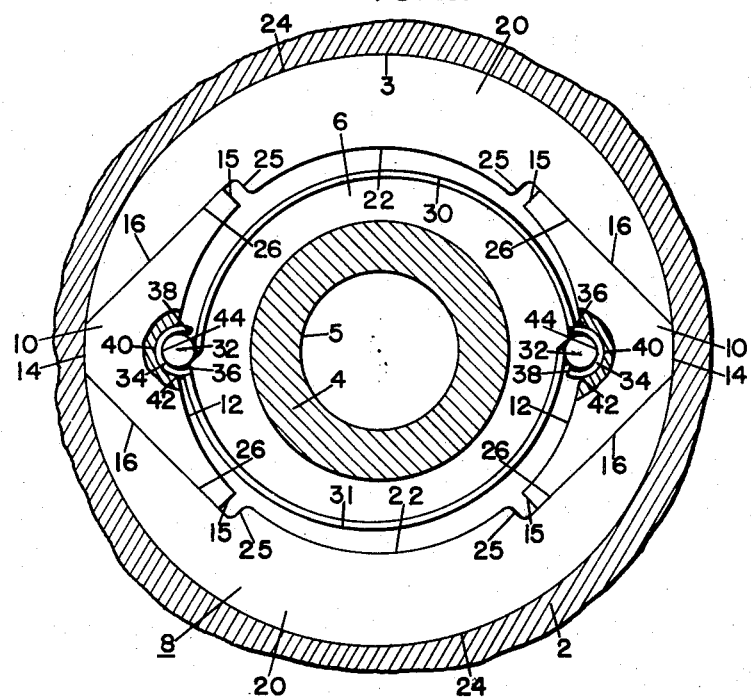
INVENTOR:
EUGENE J. DOPERALSKI
BY Charles F. Osgood.
ATTORNEY July 21, 1959  E. J. DOPERALSKI  2,895,774
PISTON ASSEMBLY
Filed April 15, 1957
2 Sheets-Sheet 2
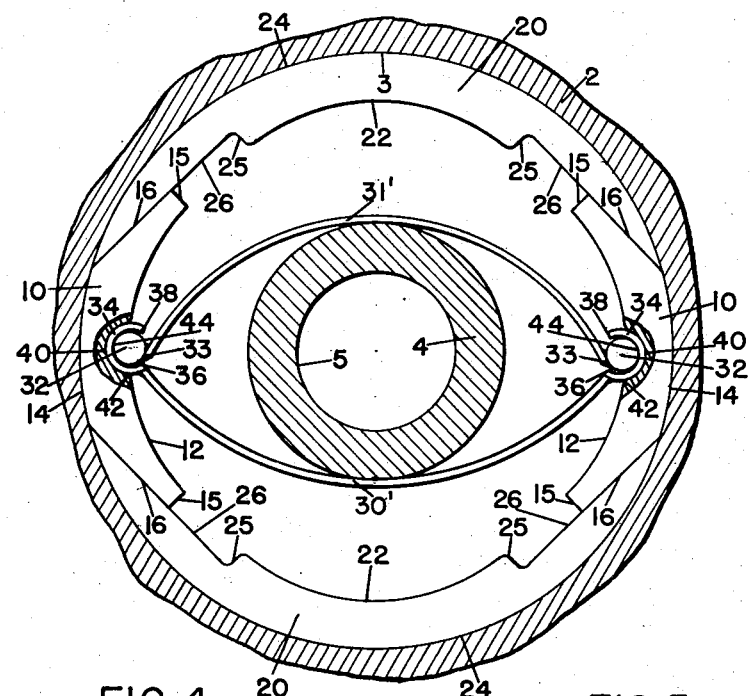
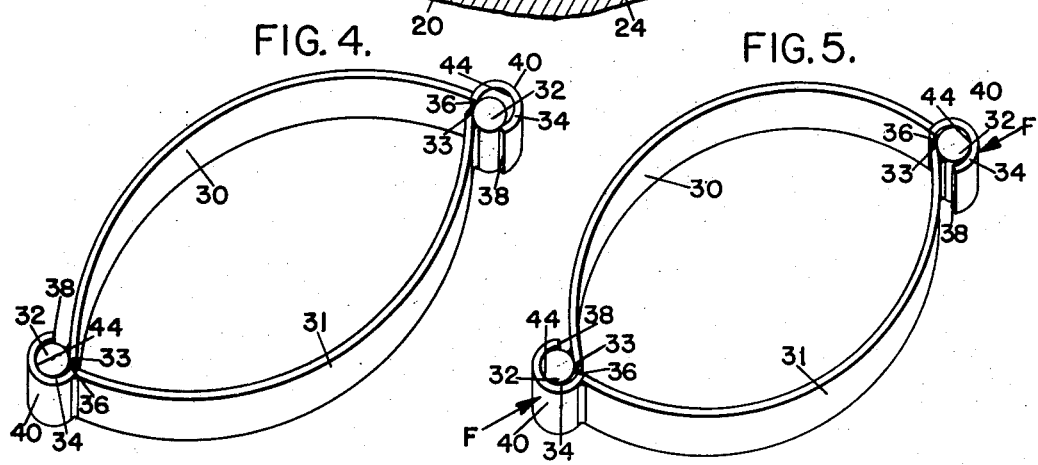
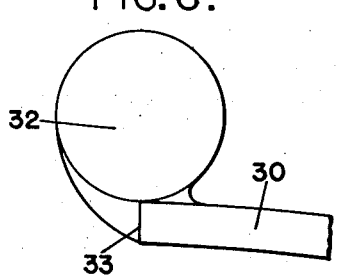
INVENTOR:
EUGENE J. DOPERALSKI
BY Charles F. Osgood
ATTORNEY

United States Patent Office 2,895,774
Patented July 21, 1959

2,895,774

PISTON ASSEMBLY

Eugene J. Doperalski, Michigan City, Ind., assignor to Joy Manufacturing Company, Pittsburgh, Pa., a corporation of Pennsylvania Application April 15, 1957, Serial No. 652,726

16 Claims. (Cl. 309—38)

My invention relates to a packed piston assembly and more particularly to a packed piston assembly having ring segments which are biased outwardly by an interlocking expander.

At the present time numerous industrial applications require compressed air which is free of hydrocarbons for various well-known reasons. In order to meet the these requirements it has been common practice to employ a plurality of partially overlapping carbon packing segments which are disposed to extend outwardly around a compressor piston and engage the sides of a compressor cylinder. Such a segmental carbon packing or, as more commonly known, carbon piston ring eliminates the need for lubricating the compressor cylinder. It has also been common practice to provide one or more means spaced inwardly of the cylinder wall and engageable with one or more of the ring segments to bias each of the ring segments radially outwardly into engagement with the sides of the compressor cylinder.

Some prior attempts to bias the piston ring segments outwardly have employed elongated spring expanders of various configurations which are made of hardened steel or an alloy thereof. Such spring expanders have engaged the inner circumference of the ring at spaced locations in a manner that excessive wearing therebetween has occurred. Still other prior elongated spring expanders have employed highly stressed regions such that the life of the expanders is quite short and, in many instances, breakage occurs at a highly stressed region so that the broken ends of the expanders may move out of the piston grooves and cause damage to the cylinder, the piston, or the valves. Another problem with such prior flat spring expanders is that upon breaking away of the carbon rings the expanders may become exposed and cause damage to the cylinder sidewalls.

Accordingly, one object of my invention is to provide a new and improved piston assembly having an interlocking ring expanding means.

Another object of my invention is to provide a new and improved piston assembly having spaced means for pivotally engaging opposed portions on the inner circumference of a segmental piston ring.

A more specific object of my invention is to provide a new and improved piston ring expander comprising a pair of reversely disposed elongated spring members having interlocking elements.

Another specific object of my invention is to provide a new and improved piston assembly having a circumferential groove in which a pair of interlocking expanding means are located which are engageable with the bottom of the groove before the ends thereof extend beyond the groove.

Still another specific object of my invention is to provide an elongated piston ring expander having a cylindrical portion at one end and a dished bearing portion at the other end which are interlockable with another of such expanders.

Another specific object of my invention is to provide an elongated piston ring expander having cylindrical portions at opposite ends which are interlockable with another elongated piston ring expander having dished bearing portions at opposite ends.

These and other objects of my invention will become more apparent when taken in conjunction with the following detailed description of preferred embodiments thereof and the following drawings in which:

Figure 1 is a longitudinal sectional view of a piston-type compressor showing a portion of a cylinder with a piston therein which piston has piston ring assemblies constructed in accordance with the principles of my invention;

Figure 2 is a cross sectional view of the piston-type compressor as shown in Figure 1 taken substantially along the line II—II thereof;

Figure 3 is a cross sectional view similar to Figure 2 showing another piston ring assembly constructed in accordance with the principles of my invention and showing the ring segments after considerable wear has occurred;

Figure 4 is a perspective view of the piston ring expanders as shown in Figure 2 when partially assembled together;

Figure 5 is a perspective view of the piston ring expanders as shown in Figure 2 when assembled together;

Figure 6 is an enlarged top plan view of one end of a piston ring expander constructed in accordance with the principles of my invention.

Referring to the Figures 1 and 2 it will be noted that a conventional compressor cylinder 2 is shown in part having an inner bore 3 in which a suitable generally cylindrical piston 4 is received. As shown, the piston 4 is provided with a central bore 5 to facilitate connecting the piston 4 in any suitable manner to suitable reciprocating means whereby the piston 4 reciprocates within the cylinder 2. The piston 4 is also provided with axially spaced circumferential grooves 6 having generally parallel sides and in each of which a suitable hollow packing means, such as a carbon segment piston ring 8, is located to extend circumferentially around the piston 4 and to circumferentially engage the bore 3 of the cylinder 2. Inasmuch as such pistons 4, cylinders 2 and the mounting thereof are well known in the art further description and illustration thereof are not believed to be necessary.

Each of the carbon piston rings 8 comprises a pair of identical diametrically spaced wedge shaped segments 10 which are of a thickness to be closely received between the parallel sides of the grooves 6. As shown in Figure 2, each wedge segment 10 comprises an inner elongated arcuate surface 12 spaced outwardly from the bottom of the grooves 6 and a shorter, outer arcuate surface 14 which engages the bore 3 of the cylinder 2. A radially outwardly extending end surface 15 is provided at each end of the inner surface 12 to provide sufficient strength to the ends of the wedge segments 10. The surfaces 15 are connected to the cylinder wall engaging surface 14 by means of elongated side surfaces 16 extending therebetween.

It will be noted (Figure 2) that each wedge segment 10 is symmetrically disposed about the horizontal center line of the piston 4 with one of the surfaces 16 extending at an angle of 45° downwardly from the horizontal axis and inwardly of the cylinder 2 and the other of the surfaces 16 extending at an angle of 45° upwardly from the horizontal axis and inwardly of the cylinder 2. Inasmuch as the surfaces 16 of each segment 10 are each located at an angle of 45° to the horizontal axis and on opposite sides thereof, they are perpendicular to each other. It will also be noted that as described the surfaces 16 of a wedge segment 10 lie in planes which are convergent toward the outer side of the piston ring assembly. Further, as the wedge segments 10 are reversely disposed about the vertical center line (Figure 2) of the piston 4, the surfaces 16 of spaced wedge segments 10 are located on the same side of the horizontal axis and are also perpendicular to each other. Thus the surfaces 16 of the spaced wedge segments 10 would form the sides of a square if extended.

Each of the carbon piston rings also comprises a pair of identical diametrically spaced elongated arcuately shaped segments 20 which are of a thickness to be closely received between the parallel sides of the groove 6 and are cooperable with the wedge segments 10 to form a circular body which extends outwardly of the groove 6 into engagement with the bore 3 of the cylinder 2. As shown, each segment 20 comprises an inner elongated arcuate surface 22 spaced outwardly from the bottom of the groove 6 and an outer elongated arcuate surface 24 which engages the wall or bore of the cylinder 2. The surfaces 22 extend arcuately between the end surfaces 15 located on the same side of the horizontal axis of spaced wedge segments 10, respectively. A radially inwardly extending surface 25 is provided at each end of the surface 22 of each segment 20 to provide a recess in which the outer surfaces 15 of the wedge segment 10 are located. As shown, each of the surfaces 25 of a segment 20 are connected to the outer arcuate surface 24 by means of elongated side surfaces 26 which are angularly disposed with relation to the horizontal and vertical axes of the piston 4 in the same manner as the surfaces 16 heretofore described so as to be engageable with the surface 16 similarly disposed.

In order to provide means for biasing the segments 10 and 20 outwardly into engagement with the bore 3 of the cylinder 2, a pair of identical elongated arcuate spring members 30 and 31 are provided (Figures 1, 2, 4 and 5) which have a cylinder portion 32 rigidly secured to one end and an elongated dished bearing portion 34 rigidly secured to the other end. In general the spring members 30 and 31 are formed from any suitable resilient material having sufficient mechanical strength, such as a stainless spring steel, and the cylinder portion 32 and the bearing portion 34 are formed as separate components and secured to the spring member 30 in any suitable manner such as by being soldered or brazed thereto. If desired, the cylinder portion 32 and the bearing portion 34 may be formed integral with the spring member. Referring to Figures 4 and 5, each of the spring members 30 and 31 is secured to a bearing portion 34 adjacent one end 36 thereof so that the other end 38 thereof is spaced outwardly from the spring member and with the opening therebetween facing generally inwardly toward the center of the spring members. Each bearing portion 34 is provided with an outer arcuate surface 40, a portion of which is closely received within one of a pair of opposed arcuate slots 42 which extend inwardly of the wedge segments 20 from the surfaces 12 thereof, respectively. The bearing portions 34 are also provided with inner arcuate surfaces 44 which are pivotably engaged by a cylinder portion 32.

Referring to Figure 6 it will be noted that the cylinder portion 32 is secured in abutting relationship on the outer side of the spring member 30 so that the end 33 of the spring member extends radially with respect thereto. As shown, the cylinder portion 32 is welded to the spring member 30 with the weld material extending arcuately between the end 33 of the spring member and the cylinder portion 32. The cylinder portion 32 is secured to the spring member 31 in the same manner as the cylinder portion 32 is secured to the spring member 30.

The ends 36 and 38 of the bearing portions 34 are spaced apart from each other a distance slightly greater than the diameter of the cylindrical portion 32 to just permit insertion of the cylinder portion 32 therein. In view of such close spacing of the ends 36, 38 the cylinder portion 32 must be properly aligned with reference to the ends 36, 38 in order to insert the cylinder portion 32 therebetween. Thus, as shown in Figure 4, in assembling an expander ring the cylinder portion 32 of the spring member 30 is initially aligned with respect to the ends 36, 38 of the bearing portion 34 of the spring member 31 and then inserted therebetween into engagement with the arcuate surface 44 of the spring member 31. After such engagement the spring members 30 and 31 are rotated with respect to each other about the pivot axis of the engaged cylinder portion 32 and bearing portion 34 until the cylinder portion 32 of the spring member 31 engages the spaced ends 36, 38 of the bearing member 34 of the spring member 30. It will be noted, however, that due to the normal curvature of the spring members 30 and 31 the cylinder portion 32 of the spring member 31 cannot pass between the spaced ends 36, 38 of the bearing member 34 of the spring member 30, as the end 38 engages the outer surface of the cylinder 32 and the end 36 engages the weld material joining the cylinder portion 32 to the spring member 31. It of course will be obvious that in order to accomplish this purpose the ends 36, 38 of a bearing portion 34 must be spaced apart a distance to permit passage therebetween of a cylinder portion 32 having a given diameter but which will not permit passage therethrough of a larger cylinder having a diameter equal to the given diameter of a cylinder portion 32 plus an incremental portion equal to the radial distance of the segment located beyond the outer surface of the cylinder portion 32 which is engaged by the end 36. Also as the spring members 30 and 31 are identical it is immaterial which cylinder portions 32 and bearing portions 34 are initially engaged.

Engagement of the non-engaged end may easily be obtained by forcing the ends of the spring members 30 and 31 towards each other in any suitable manner such as by applying hand pressure to the other surfaces 40 of the bearing portions 34 as shown illustratively in Figure 5 by means of arrows F. By applying such a force the radius of curvature of the spring members 30 and 31 is decreased and accordingly, both the end 33 of the spring member 31 and the end 36 of the bearing portion 34 of the spring member 30 move away from each other. A force F is applied which is sufficient whereby the end 36 of the bearing portion 34 of the spring member 30 is spaced a sufficient distance from the end 33 of the spring member 31 and the cylinder portion 32 of the spring member 31 is free to pass between the ends 36, 38 of the spring member 30. Upon release of the force F after each cylinder portion 32 has been received within a bearing portion 34, pivotal rotation of cylinder portions 32 in the bearing portions 34 respectively will occur whereby the radius of curvature of the spring members 30 and 31 are increased so that the spring members 30 and 31 are locked together.

In view of the fact that the force required to assemble a pair of spring members 30 and 31 together is applied to the outer surfaces 40, the spring members 30 and 31 can readily be assembled in the above described manner within a groove 6 of the piston 4. Thereafter the ring 8 is assembled within the groove 6 around the spring members 30 and 31 so that the slots 42 of the wedge segments 10 engage the outer surfaces 40 of the bearing portions 34. It will be obvious that the ring 8 must be circumferentially restricted in any well-known manner to permit the insertion of the piston assembly within the cylinder 2 so that the outer surface of the ring 8 engages the bore 3. Referring to Figure 2 it will be noted that the wedge segments 10 are of a radial length so that the radius of curvature of each of the spring members 30 and 31 is substantially decreased with reference to their normal or free radius of curvature when the piston assembly is located within the cylinder 2. Inasmuch as the bearing portions 34 are pivotably received within the slots 42 the spring members 31 and 30 will each assume substantially the same radius of curvature with the inner surfaces thereof being spaced outwardly the same distance from the bottom of the groove 6. As shown, the spring members 30 and 31 and the segments 10 are preferably of a size so that when located as described the spring members 30 and 31 form a substantially circular piston ring expander. Since the ends of the spring members 30 and 31 are forced inwardly toward each other during their insertion within the cylinder 2 it will be obvious that the spring members 30 and 31 will bias the wedge segments 10 radially outwardly.

As is well known the outer surface of the ring 8 wears away during its normal usage so that the bearing portions 34 of spring members 30 and 31 will move outwardly from each other. Such outward movement of the bearing portions 34 is readily accomplished by the pivotal engagement of the outer surface 40 of the bearing portions 34 with the arcuate slots 42 and the pivotal engagement of the cylinder 32 with the inner surface 44 of the bearing portions 34. Such outward movement of the ends of the spring members 30 and 31 continues until the central portion of the spring members 30 and 31 engages the bottom of the groove 6 as shown in Figure 3. One such engagement occurs, further biasing of the wedge segments 10 by means of the spring members can no longer occur. The spring members 30 and 31 are also of a length so that the bearing portions 34 thereof are located within the groove 6 when the bottom of the groove 6 is so engaged so that it is impossible to score the bore 3 in the event of excessive wear or breaking of the wedge segments 10. It will also be noted (Figure 3) that the spring members in the extreme wearing position remain locked together in the groove 6.

As indicated the slots 42 are diametrically spaced from each other and accordingly the engaged cylinder portions 32 and bearing portions 34 are also diametrically spaced from each other. Thus the force applied by the space members 30 and 31 to the wedge segments 10 bias the wedge segments 10 diametrically outwardly. As more clearly explained in the copending application entitled Piston Assembly, Serial No. 652,728, filed April 15, 1957, by Esper Kodra and myself, which has been assigned to the same assignee as this invention, due to the described configuration of the segments 10 and 20 uniform outward movement of the segments 10 and 20 is obtained.

In order to accomplish the purposes of my invention, it is not essential that each spring member be provided with a cylinder portion 32 at one end and bearing portion 34 at the other end. If desired, as shown in Figure 3, one spring member 30' may be provided with a bearing portion 34 at each of its ends in the same manner as heretofore described and another spring member 31' may be provided with a cylinder portion 32 at each of its ends in the same manner as heretofore described. Further, although the cylinder portions 32 of each illustrative embodiment of my invention may be formed from various materials having sufficient mechanical strength they are preferably formed from a material, such as brass, which is softer than the material, such as stainless steel, from which the bearing portions 34 are formed so that in the event of any wear therebetween, the wear will occur on the cylinder portions 32. The wearing of the cylinder portions 32 will not have any substantial affect upon the operating characteristics of the spring members as heretofore described.

Thus it will be noted that I have provided a unique piston ring expander which is capable of economical manufacture. In addition, such piston ring expanders prevent damage from occurring to the cylinder sidewalls as they are prevented from engaging the cylinder sidewalls under adverse conditions. Having described preferred embodiments of my invention in accordance with the patent statutes, it is to be realized that modifications thereof may be made without departing from the broad spirit of my invention. Accordingly, it is respectfully requested that my invention be interpreted as broadly as possible and as limited only by the prior art.

What I claim is:

1. A piston ring assembly comprising, a hollow body, expanding means extending between and engaging opposed portions on the inner surface of said body, said expanding means comprising a pair of elongated resilient arcuate members reversely disposed in relation to each other to form a hollow member, each of said arcuate members having a first means at one end thereof and a second means at the other end thereof insertable within said first means on said one end of the other of said arcuate members.

2. A piston ring assembly comprising, a multi-piece hollow body, expanding means extending between and engaging opposed portions on the inner surface of said body, said expanding means comprising a pair of elongated resilient arcuate members reversely disposed in relation to each other to form a hollow member, each of said arcuate members having dished means at one end thereof and means at the other end thereof insertable within said dished means on said one end of the other of said arcuate members.

3. A piston ring assembly comprising, a plurality of segmental sections disposed in engagement with each other to form a hollow body, expanding means extending between and pivotably engaging opposed portion on the inner surface of spaced sections of said body, said expanding means comprising, a pair of elongated resilient arcuate members reversely disposed in relation to each other to form a hollow member, and each of said arcuate members having dished means at one end thereof and cylindrical means at the other end thereof insertable within said dished means on said one end of the other of said arcuate members.

4. A piston assembly comprising, a piston having a circumferential groove therein, a plurality of segmental sections disposed in said groove and in engagement with each other to form a hollow body with the inner surface spaced outwardly from the bottom of said groove, expanding means extending between and pivotably engaging opposed portions on said inner surface of said body, said expanding means comprising, a pair of elongated resilient arcuate members reversely disposed in relation to each other to form a hollow member, each of said arcuate members having dished means at one end thereof having an outer surface defining a pivot axis in conjunction with one of said opposed portions of said body, each of said arcuate members having cylindrical means at the other end thereof insertable within said dished means on said one end of the other of said arcuate members to pivotally engage the inner surface thereof, and said arcuate members being disposed between the bottom of said groove and said inner surface of said body.

5. A piston assembly comprising, a piston having a circumferential groove therein, a plurality of segmental sections disposed in said groove and in engagement with each other to form a hollow body with the inner surface spaced outwardly from the bottom of said groove, expanding means extending between and pivotably engaging opposed portions on said inner surface of said body, said expanding means comprising, a pair of elongated resilient arcuate members reversely disposed in relation to each other to form a hollow member, each of said arcuate members having dished means at one end thereof having an outer surface defining a pivot axis in conjunction with one of said opposed portions of said body, each of said arcuate members having cylindrical means at the other end thereof insertable within said dished means on said one end of the other of said arcuate members to pivotally engage the inner surface thereof, said arcuate members being disposed between the bottom of said groove and said inner surface of said body, and said arcuate members being of a length so that their ends are located within said groove when the central portion thereof engages the bottom of said groove upon outward movement of the ends of said members.

6. A piston assembly comprising, a piston having a circumferential groove therein, a plurality of segmental sections disposed in said groove and in engagement with each other to form a hollow body with the inner surface spaced outwardly from the bottom of said groove, an elongated two piece resilient expanding means having interlocked end portions engaging opposed portions on said inner surface of said body to bias said body outwardly of said groove, and said expanding means extending around the bottom of said groove and having a length with respect to said groove that said end portions thereof are located in said groove when the portions intermediate said end portions engage said bottom of said groove.

7. A piston assembly comprising, a piston having a circumferential groove therein, a plurality of segmental sections disposed in said groove and in engagement with each other to form a hollow body with the inner surface spaced outwardly from the bottom of said groove, an elongated, resilient, hollow expanding means having opposed portions extending between and pivotably engaging opposed portions on said inner surface of said body, said expanding means extending around the bottom of said groove and having a length with respect to said groove that said opposed portions are located in said groove when the portions of said expanding means intermediate said opposed portions engage said bottom of said groove.

8. A piston ring expanding means comprising, a pair of elongated resilient arcuate members reversely disposed in relation to each other to form a hollow member, and each of said arcuate members having dished means at one end thereof and locking cylindrical means at the other end thereof insertable within said dished means on said one end of the other of said arcuate members.

9. A piston ring expanding means comprising a pair of elongated resilient arcuate members reversely disposed in relation to each other to form a hollow member, each of said arcuate members having a first means at one end thereof and a second means at the other end thereof insertable within said first means on said one end of the other of said arcuate members.

10. A piston ring expanding means comprising a pair of elongated resilient arcuate members reversely disposed in relation to each other to form a hollow member, each of said arcuate members having dished means at one end thereof and cylindrical means at the other end thereof insertable within said dished means on said one end of the other of said arcuate members, so as to be pivotably moveable therein.

11. A piston ring expander comprising, an elongated arcuate spring member having an elongated transversely extending dished portion and an elongated transversely extending cylindrical portion at opposite ends thereof, said cylindrical portion having its outer surface in engagement with the outer surface of said arcuate portion, and said dished portion having its open side facing inwardly of said arcuate spring member.

12. A piston ring expander comprising, an elongated arcuate spring member having an elongated transversely extending dished portion and an elongated transversely extending cylindrical portion at opposite ends thereof, said cylindrical portion having its outer surface in engagement with the outer surface of said arcuate spring member, said dished portion having its open side facing inwardly of said arcuate portion and said dished portion having the edges forming said open side spaced apart a distance only slightly greater than the diameter of said cylindrical portion.

13. A piston ring expander comprising, a pair of identical elongated arcuate members, each having an elongated transversely extending dished portion and an elongated transversely extending cylindrical portion at opposite ends thereof, said cylindrical portion having its outer surface in engagement with the outer surface of said arcuate spring member, said dished portion of each of said arcuate members having its open side facing inwardly thereof with the edges forming said open side spaced apart a distance only slightly greater than the diameter of said cylindrical portion, said cylindrical portion of one of said arcuate members being insertable within the dished portion of the other of said arcuate members whereby the other cylindrical portion and dished portion of said arcuate members may be moved toward each other in a definite arcuate path, said arcuate members having a normal radius of curvature so that upon such movement the edges forming the open side of said dished portion of said one arcuate member engages an outer surface of the other cylindrical portion and said inner surface of said other arcuate member, respectively, whereby said other cylindrical portion cannot pass therebetween, and said arcuate members being resilient to permit increasing their radius of curvature whereby said other cylindrical portion can pass between said edges of said dished portion of said one of said arcuate members.

14. A piston ring expander comprising, a pair of elongated arcuate members, interlocking means at one end of each of said arcuate members whereby the other ends of said arcuate members may be moved toward each other, other interlocking means formed integral with the other end of each of said arcuate members, said arcuate members having a normal radius of curvature whereby said other interlocking means cannot be engaged upon such movement, and said arcuate members being resilient whereby upon increasing their radius of curvature said other interlocking means are engageable.

15. A piston ring expander comprising, a spring member having oppositely bowed portions exerting opposing forces at its opposed ends along a diametric line, and the ends of said opposed portions each being shaped to engage an expandable ring member.

16. A piston ring expanding means comprising, a spring member having oopsitely bowed portions exerting opposing forces at its opposed ends along a diametric line, said opposed ends of said opposed portions each being shaped to engage an expandable ring member, and said opposed portions each having cooperable interlocking elements at the ends thereof.

References Cited in the file of this patent

UNITED STATES PATENTS

| 256,312 | Garrett | Apr. 11, 1882 |
| 2,357,854 | Sullivan | Sept. 12, 1944 |
| 2,623,797 | Kennon | Dec. 30, 1952 |
| 2,696,414 | Green | Dec. 7, 1954 |
| 2,768,040 | Green | Oct. 23, 1956 |

FOREIGN PATENTS

| 562,246 | Germany | Oct. 22, 1932 |